(12) United States Patent
Nakashima et al.

(10) Patent No.: US 11,904,298 B2
(45) Date of Patent: Feb. 20, 2024

(54) COMPOSITE OXIDE CATALYST, POROUS COMPOSITE, AND METHOD OF PRODUCING COMPOSITE OXIDE CATALYST

(71) Applicant: NGK INSULATORS, LTD., Nagoya (JP)

(72) Inventors: Takuya Nakashima, Nagoya (JP); Yunie Izumi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 207 days.

(21) Appl. No.: 17/022,441

(22) Filed: Sep. 16, 2020

(65) Prior Publication Data
US 2021/0094018 A1 Apr. 1, 2021

(30) Foreign Application Priority Data

Sep. 27, 2019 (JP) .................................. 2019-176556

(51) Int. Cl.
| | | |
|---|---|---|
| *B01J 23/34* | (2006.01) | |
| *B01J 23/10* | (2006.01) | |
| *B01J 35/10* | (2006.01) | |
| *B01J 35/00* | (2006.01) | |
| *B01J 35/04* | (2006.01) | |
| *B01J 37/04* | (2006.01) | |
| *B01J 37/08* | (2006.01) | |
| *F01N 3/035* | (2006.01) | |

(52) U.S. Cl.
CPC ............... *B01J 23/34* (2013.01); *B01J 23/10* (2013.01); *B01J 35/0006* (2013.01); *B01J 35/04* (2013.01); *B01J 35/10* (2013.01); *B01J 37/04* (2013.01); *B01J 37/08* (2013.01); *F01N 3/035* (2013.01)

(58) Field of Classification Search
CPC ... B01J 23/34; B01J 23/10; B01J 35/04; B01J 35/10; B01J 35/0006; B01J 37/04; B01J 37/08; F01N 3/035
See application file for complete search history.

(56) References Cited

U.S. PATENT DOCUMENTS

| | | | |
|---|---|---|---|
| 2010/0329954 A1 | 12/2010 | Yokota et al. | |
| 2012/0131911 A1* | 5/2012 | Nakagawa | B01J 35/1019 502/355 |
| 2016/0121300 A1* | 5/2016 | Sakurai | B01J 35/04 423/213.2 |
| 2017/0284264 A1 | 10/2017 | Izumi et al. | |
| 2018/0021759 A1* | 1/2018 | Huang | B01J 23/34 502/303 |

FOREIGN PATENT DOCUMENTS

| | | |
|---|---|---|
| CN | 107262109 A | 10/2017 |
| JP | 2007-237005 A | 9/2007 |
| JP | 2010-005580 A | 1/2010 |
| JP | 2010-530343 A | 9/2010 |
| JP | 2014-124631 A1 | 7/2014 |
| JP | 2014-200771 A1 | 10/2014 |
| JP | 2016-036782 A1 | 3/2016 |
| JP | 2018-506424 A | 3/2018 |
| WO | 2014/102586 A1 | 7/2014 |

OTHER PUBLICATIONS

Kuznetsova et al. Chemistry for Sustainable Development, (2005), 13, 775-781.*
Russo et al., J. of Catal., (2005), v229, p. 459-469.*
Civera et al., Catal. Today, (2003), v83, p. 199-211.*
Japanese Office Action (with English translation), Japanese Application No. 2019-176556 dated Dec. 22, 2022 (15 pages).
Shuai et al., "Preparation of Catalytic Properties of $La_xCe_{1-x}MnO/\gamma-Al_2O_3$ Catalyst for Catalytic Combustion of Toluene," Chinese Journal of Environmental Engineering, Aug. 2012, vol. 6, No. 8, pp. 2759-2763 (with English translation).
Chinese Office Action dated Nov. 23, 2022 (Application No. 202010977202.7).

* cited by examiner

*Primary Examiner* — Yong L Chu
(74) *Attorney, Agent, or Firm* — BURR PATENT LAW, PLLC

(57) ABSTRACT

A composite oxide catalyst includes Ce that is a first metal, La that is a second metal, and a third metal as contained metals. The third metal is a transition metal, or a rare-earth metal other than Ce and La. A Ce content in the contained metals is higher than or equal to 5 mol % and lower than or equal to 95 mol %. An La content in the contained metals is higher than or equal to 2 mol % and lower than or equal to 93 mol %. A content of the third metal in the contained metals is higher than or equal to 2 mol % and lower than or equal to 93 mol %.

8 Claims, 3 Drawing Sheets

US 11,904,298 B2

COMPOSITE OXIDE CATALYST, POROUS COMPOSITE, AND METHOD OF PRODUCING COMPOSITE OXIDE CATALYST

TECHNICAL FIELD

The present invention relates to a composite oxide catalyst, a method of producing the composite oxide catalyst, and a porous composite including the composite oxide catalyst.

CROSS-REFERENCE TO RELATED APPLICATION

This application claims priority benefit under 35 U.S.C. Section 119 of Japanese Patent Application No. 2019-176556 filed in the Japan Patent Office on Sep. 27, 2019, the entire disclosure of which is incorporated herein by reference.

BACKGROUND ART

Vehicles that mount a diesel engine or a gasoline engine are equipped with filters for collecting and burning (i.e., oxidizing and removing) particulate matter (PM) such as soot in an exhaust gas. Japanese Patent Application Laid-Open No. 2016-36782 (Document 1) proposes a catalyst that includes a plurality of alumina layers laminated one above another and Ag alloys dispersed between these alumina layers, as a particulate matter combustion catalyst supported by an exhaust gas purifying filter. The Ag alloys are of at least one type selected from the group consisting of AgZr alloys, AgPt alloys, and AgPd alloys.

Japanese Patent Application Laid-Open No. 2014-124631 (Document 2) proposes an exhaust gas purification catalyst for oxidizing and removing particulate matter contained in an exhaust gas from a lean-burn engine. The exhaust gas purification catalyst contains a first metal oxide selected from the group consisting of praseodymium oxide, terbium oxide, and a combination of these oxides, and a second metal oxide selected from the group consisting of lanthanum oxide, neodymium oxide, yttrium oxide, and any combination of these oxides.

An exhaust gas purification catalyst proposed in Japanese Patent Application Laid-Open No. 2014-200771 (Document 3) contains a first metal oxide selected from the group consisting of praseodymium oxide, terbium oxide, and a combination of these oxides, a second metal oxide that is neodymium oxide, a third metal oxide that is zirconia or a combination of zirconia and ceria, and a fourth metal oxide selected from the group consisting of lanthanum oxide, yttrium oxide, barium oxide, calcium oxide, strontium oxide, silicon oxide, and any combination of these oxides.

Incidentally, the particulate matter combustion catalyst of Document 1 increases the cost of its production due to the use of elements of the platinum group. This particulate matter combustion catalyst also suffers a great decrease in PM combustion rate caused by a high-temperature durability test. The exhaust gas purification catalysts of Documents 2 and 3 further contain elements of the platinum group such as platinum or iridium and thus increase the cost of their production.

At present, there is demand for catalysts capable of burning (i.e., oxidizing) particulate matter or other objects in an exhaust gas at a low temperature without using any expensive material such as the elements of the platinum group.

SUMMARY OF INVENTION

The present invention is intended for a composite oxide catalyst, and it is an object of the present invention to lower the temperature at which oxidation of an object starts (hereinafter, "oxidation starting temperature").

A composite oxide catalyst according to a preferable embodiment of the present invention includes cerium that is a first metal, lanthanum that is a second metal, and a third metal as contained metals. The third metal is a transition metal, or a rare-earth metal other than cerium and lanthanum. A cerium content in the contained metals is higher than or equal to 5 mol % and lower than or equal to 95 mol %. A lanthanum content in the contained metals is higher than or equal to 2 mol % and lower than or equal to 93 mol %. A content of the third metal in the contained metals is higher than or equal to 2 mol % and lower than or equal to 93 mol %.

According to the present invention, it is possible to lower the oxidation starting temperature of an object.

Preferably, the cerium content in the contained metals is higher than or equal to 50 mol % and lower than or equal to 95 mol %. The lanthanum content in the contained metals is higher than or equal to 2 mol % and lower than or equal to 48 mol %. The content of the third metal in the contained metals is higher than or equal to 2 mol % and lower than or equal to 48 mol %.

More preferably, the third metal is manganese or praseodymium. The lanthanum content in the contained metals is equal to the content of the third metal in the contained metals.

Preferably, the composite oxide catalyst includes particles including cavities when viewed in an SEM image taken at 5000× magnification.

More preferably, the cavities have diameters greater than or equal to 0.2 µm and less than or equal to 5 µm.

The present invention is also intended for a porous composite. A porous composite according to a preferable embodiment includes a porous base material, and a porous collection layer formed on the base material. The collection layer includes the above-described composite oxide catalyst.

Preferably, the base material has a honeycomb structure whose inside is partitioned into a plurality of cells by a partition wall. At least some of the plurality of cells have inner surfaces covered with the collection layer.

More preferably, the porous composite is a filter that collects particulate matter in an exhaust gas emitted from a gasoline engine or a diesel engine.

The present invention is also intended for a method of producing a composite oxide catalyst. The method of producing a composite oxide catalyst according to a preferable embodiment includes preparing a mixed aqueous solution by mixing a nitrate of a raw metal and citric acid, obtaining a precursor by heating the mixed aqueous solution, and obtaining a composite oxide catalyst by firing the precursor. The raw metal includes cerium that is a first metal, lanthanum that is a second metal, and a third metal. The third metal is a transition metal, or a rare-earth metal other than cerium and lanthanum. A cerium content in the raw metal is higher than or equal to 5 mol % and lower than or equal to 95 mol %. A lanthanum content in the raw metal is higher than or equal to 2 mol % and lower than or equal to 93 mol %. A content of the third metal in the raw metal is higher than or equal to 2 mol % and lower than or equal to 93 mol %.

These and other objects, features, aspects and advantages of the present invention will become more apparent from the following detailed description of the present invention when taken in conjunction with the accompanying drawings.

DESCRIPTION OF EMBODIMENTS

Figure 1:
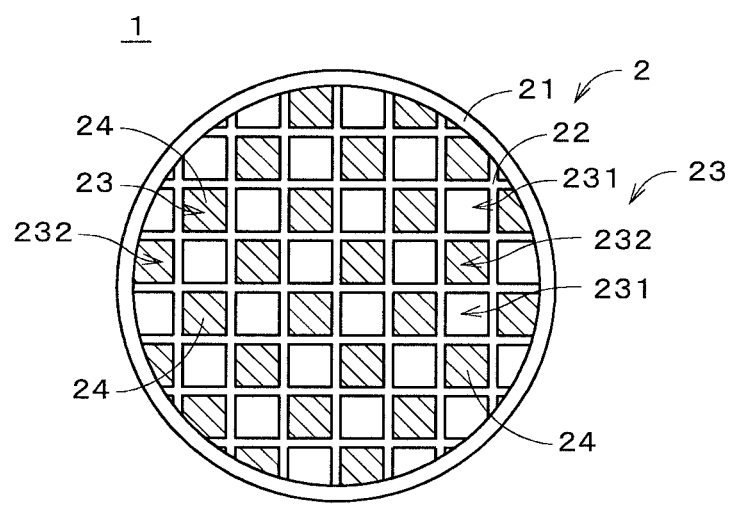
FIG. 1 is a plan view of a porous composite according to an embodiment.
Figure 2:
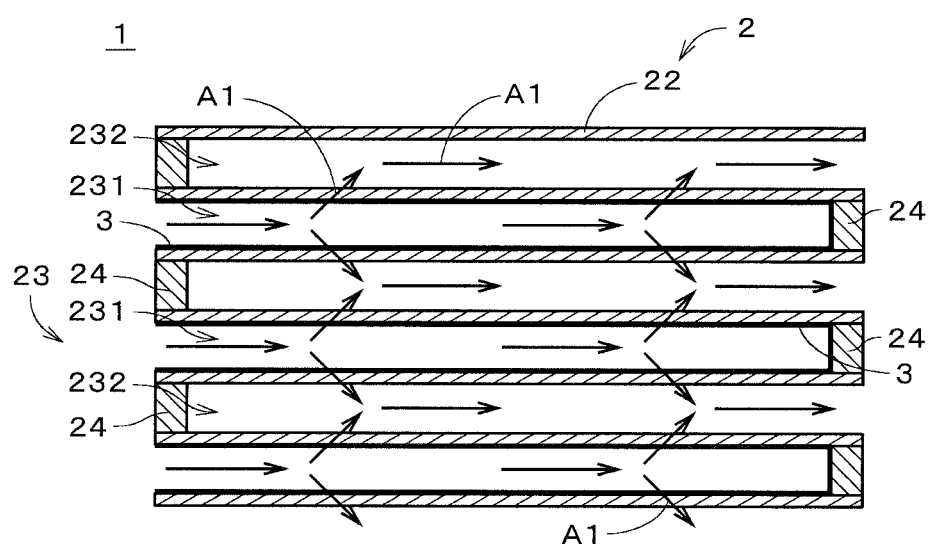
FIG. 2 is a sectional view of the porous composite.

FIG. 1 is a plan view illustrating a porous composite 1 according to one embodiment of the present invention in simplified form. The porous composite 1 is a tubular member that is long in one direction. In FIG. 1, the end face on one side in the longitudinal direction of the porous composite 1 is illustrated. FIG. 2 is a sectional view of the porous composite 1. In FIG. 2, part of a section taken along the longitudinal direction is illustrated. For example, the porous composite 1 is used as a gasoline particulate filter (GPF) for collecting particulate matter such as soot in an exhaust gas emitted from a gasoline engine of a vehicle such as an automobile.

The porous composite 1 includes a porous base material 2 and a porous collection layer 3. In the example illustrated in FIGS. 1 and 2, the base material 2 is a member having a honeycomb structure. The base material 2 includes a tubular outer wall 21 and a partition wall 22. The tubular outer wall 21 is a tubular portion that extends in the longitudinal direction (i.e., the left-right direction in FIG. 2). The tubular outer wall 21 has, for example, a generally circular sectional shape perpendicular to the longitudinal direction. This sectional shape may be any other shape such as a polygonal shape.

The partition wall 22 is a grid-shaped portion that is provided inside the tubular outer wall 21 and partitions the inside into a plurality of cells 23. Each of the cells 23 is a space extending in the longitudinal direction. Each cell 31 has, for example, a generally square sectional shape perpendicular to the longitudinal direction. This sectional shape may be any other shape such as a polygonal shape or a circular shape. These cells 23 have the same sectional shape as a general rule. Alternatively, these cells 23 may include cells 23 that have different sectional shapes. The base material 2 is a cell structure whose inside is partitioned into the cells 23 by the partition wall 22.

The tubular outer wall 21 and the partition wall 22 are both porous portions. The tubular outer wall 21 and the partition wall 22 are formed of, for example, ceramic. The chief material of the tubular outer wall 21 and the partition wall 22 is preferably cordierite ($2MgO \cdot 2Al_2O_3 \cdot 5SiO_2$). The material of the tubular outer wall 21 and the partition wall 22 may be ceramic other than cordierite, or may be a material other than ceramic.

The tubular outer wall 21 has a length of, for example, 50 mm to 300 mm in the longitudinal direction. The outside diameter of the tubular outer wall 21 is, for example, in the range of 50 mm to 300 mm. The thickness of the tubular outer wall 21 is, for example, greater than or equal to 30 micrometers ($\mu m$) and preferably greater than or equal to 50 $\mu m$. The thickness of the tubular outer wall 21 is also, for example, less than or equal to 1000 $\mu m$, preferably less than or equal to 500 $\mu m$, and more preferably less than or equal to 350 $\mu m$.

The length of the partition wall 22 in the longitudinal direction is generally the same as that of the tubular outer wall 21. The thickness of the partition wall 22 is, for example, greater than or equal to 30 $\mu m$ and preferably greater than or equal to 50 $\mu m$. The thickness of the partition wall 22 is also, for example, less than or equal to 1000 $\mu m$, preferably less than or equal to 500 $\mu m$, and more preferably less than or equal to 350 $\mu m$. The porosity of the partition wall 22 is, for example, higher than or equal to 20% and preferably higher than or equal to 30%. The porosity of the partition wall 22 is also, for example, lower than or equal to 80% and preferably lower than or equal to 70%. The porosity can be measured by, for example, Archimedes method using deionized water as a medium. A mean pore diameter of the partition wall 22 is, for example, greater than or equal to 5 $\mu m$ and preferably greater than or equal to 8 $\mu m$. The mean pore diameter of the partition wall 22 is also, for example, less than or equal to 30 $\mu m$ and preferably less than or equal to 25 $\mu m$. The mean pore diameter can be measured by, for example, mercury porosimetry (compliant with JIS R 1655).

A cell density of the base material 2 (i.e., the number of cells 23 per unit area of a section perpendicular to the longitudinal direction) is, for example, greater than or equal to 10 cells/cm$^2$ (per square centimeter), preferably greater than or equal to 20 cells/cm$^2$, and more preferably greater than or equal to 30 cells/cm$^2$. The cell density is also, for example, less than or equal to 200 cells/cm$^2$ and preferably 150 cells/cm$^2$. In the illustration in FIG. 1, the sizes of the cells 23 are greater than the actual sizes, and the number of cells 23 is smaller than the actual number. The sizes and number of cells 23 may be changed in various ways.

In the case where the porous composite 1 is used as a GPF, a gas such as an exhaust gas flows through the inside of the porous composite 1, with one end side of the porous composite 1 in the longitudinal direction (i.e., the left side in FIG. 2) as an inlet and the other end side as an outlet. Some of the cells 23 of the porous composite 1 each have a mesh sealing part 24 at the end on the inlet side, and the remaining cells 23 each have a mesh sealing part 24 at the end on the outlet side.

FIG. 1 is an illustration of the inlet side of the porous composite 1. In FIG. 1, the mesh sealing parts 24 on the inlet side are cross-hatched in order to facilitate understanding of the drawing. In the example illustrated in FIG. 1, the cells 23 that have the mesh sealing parts 24 on the inlet side and the cells 23 that do not have the mesh sealing parts 24 on the inlet side (i.e., the cells 23 that have the mesh sealing parts 24 on the outlet side) are arranged alternatively in both the vertical and lateral directions in FIG. 1.

In the following description, the cells 23 that have the mesh sealing parts 24 on the outlet side are referred to as "first cells 231," and the cells 23 that have the mesh sealing parts 24 on the inlet side are referred to as "second cells 232." In the case where there is no need to distinguish between the first cells 231 and the second cells 232, the cells 23 are collectively referred to as "cells 23" as described previously. The cells 23 of the porous composite 1 include a plurality of first cells 231 whose one ends in the longitudinal direction are sealed, and a plurality of second cells 232 whose other ends in the longitudinal direction are sealed, the first cells 231 and the second cells 232 being arranged alternately.

The collection layer 3 is formed in film form on the surface of the base material 2. In the example illustrated in FIG. 2, the collection layer 3 is provided in the first cells 231 having the mesh sealing parts 24 on the outlet side, and covers the inner surfaces of the first cells 231 (i.e., the surface of the partition wall 22). In FIG. 2, the collection layer 3 is indicated by the bold line. The collection layer 3 also covers the inner surfaces of the mesh sealing parts 24 on the outlet side in the first cells 231. On the other hand, the collection layer 3 does not exist in the second cells 232 having the mesh sealing parts 24 on the inlet side. In other words, the inner surfaces of the second cells 232 are exposed without being covered with the collection layer 3.

The collection layer 3 in the first cells 231 is formed primarily of ceramic, for example. In this case, the collection layer 3 preferably contains, as its chief material, at least one of silicon carbide, cordierite, mullite, aluminum oxide, silicon oxide, titanium oxide, zirconium oxide, iron oxide, and cerium oxide. Note that the collection layer 3 may be formed primarily of other ceramic, or may be formed primarily of a material (e.g., a composite oxide catalyst described later) other than ceramic.

A mean pore diameter of the collection layer 3 is preferably greater than or equal to 0.1 µm and less than or equal to 20 µm. The mean pore diameter is more preferably greater than or equal to 4.1 µm and less than or equal to 20 µm, and yet more preferably greater than or equal to 4.1 µm and less than or equal to 6 µm. The porosity of the collection layer 3 is preferably higher than or equal to 50% and lower than or equal to 90%. The porosity is more preferably higher than or equal to 70% and lower than or equal to 78%. A mean particle diameter of an aggregate constituting the collection layer 3 is preferably greater than or equal to 0.1 µm and less than or equal to 5 µm. The mean particle diameter is more preferably greater than or equal to 0.4 µm and less than or equal to 5 µm.

The mean pore diameter and porosity of the collection layer 3 and the mean particle diameter of the aggregate can be obtained by analyzing a scanning electron microscope (SEM) image of a polished section of the porous composite 1. This image analysis is conducted using, for example, "Image-Pro version 9.3.2" manufactured by Nippon Roper Co. Ltd.

A mean thickness across the collection layer 3 (hereinafter, referred to as an "overall mean thickness") is preferably greater than or equal to 10 µm and less than or equal to 40 µm. The overall mean thickness is more preferably greater than or equal to 30 µm and less than or equal to 40 µm. A mean thickness of the collection layer 3 at the end on the aforementioned outlet side (hereinafter, referred to as an "outlet-side mean thickness") is greater than or equal to 20 µm and less than or equal to 50 µm. The outlet-side mean thickness is more preferably greater than or equal to 35 µm and less than or equal to 50 µm. Preferably, the outlet-side mean thickness is greater than the overall mean thickness. The mean thickness of the collection layer 3 can be measured by, for example, a 3D-shape measuring instrument.

In the porous composite 1 illustrated in FIGS. 1 and 2, the gas flowing into the porous composite 1 flows into the first cells 231 from the inlets of the first cells 231 whose inlet sides are not sealed, and flows from the first cells 231 through the collection layer 3 and the partition wall 22 into the second cells 232 whose outlet sides are not sealed, as indicated by arrows A1 in FIG. 2. At this time, particulate matter in the gas is efficiently collected in the collection layer 3.

The collection layer 3 further includes a composite oxide catalyst that accelerates combustion (i.e., oxidation and removal) of the collected particulate matter. The composite oxide catalyst is preferably metal oxide particles (i.e., fine particles of a metal oxide) fixed to the chief material (e.g., the aforementioned ceramic) of the collection layer 3. Note that the composite oxide catalyst does not necessarily have to be fixed in particulate form to the chief material of the collection layer 3, and for example, may form a solid solution with the chief material. As another alternative, the chief material of the collection layer 3 may be formed primarily of the composite oxide catalyst as described above. In this case, the chief material may include, for example, the aforementioned ceramic, in addition to the composite oxide catalyst.

Metals contained in the composite oxide catalyst (hereinafter, referred to as "contained metals") include cerium (Ce) that is a first metal, lanthanum (La) that is a second metal, and a third metal. In other words, the composite oxide catalyst contains Ce, La, and the third metal as contained metals. The third metal is a transition metal, or a rare-earth metal other than Ce and La. In the case where the third metal is a transition metal, manganese (Mn) is preferably used as the third metal. In the case where the third metal is a rare-earth metal, praseodymium (Pr) is preferably used as the third metal. The third metal may be a transition metal other than Mn (e.g., cobalt (Co)), or may be a rare-earth metal other than Pr (and excluding Ce and La).

A Ce content in the contained metals of the composite oxide catalyst (hereinafter, simply referred to as "contained metals") is higher than or equal to 5 mol % and lower than or equal to 95 mol %. An La content in the contained metals is higher than or equal to 2 mol % and lower than or equal to 93 mol %. The content of the third metal in the contained metals is higher than or equal to 2 mol % and lower than or equal to 93 mol %.

Preferably, the Ce content in the contained metals is higher than or equal to 50 mol % and lower than or equal to 95 mol %, the La content therein is higher than or equal to 2 mol % and lower than or equal to 48 mol %, and the content of the third metal therein is higher than or equal to 2 mol % and lower than or equal to 48 mol %. More preferably, the third metal is Mn or Pr, and the content of the third metal in the contained metals is substantially equal to the La content in the contained metals.

Preferably, a total content of Ce, La, and the third metal in the contained metals is substantially 100 mol %. Note that the state in which the total content is substantially 100 mol % means that the content of impurity metals (i.e., metals other than Ce, La, and the third metal) in the composite oxide catalyst is lower than or equal to 1 mol %.

Next, one example of the method of producing the porous composite 1 will be described with reference to FIG. 3. In the case of producing the porous composite 1, first the outer surface of the tubular outer wall 21 of the base material 2 is covered with a liquid-impermeable sheet member. For example, a liquid-impermeable film is wrapped around generally the entire outer surface of the tubular outer wall 21.

Then, raw slurry for forming the collection layer 3 is prepared (step S11). The raw slurry is prepared by mixing, for example, particles as a raw material of the collection layer 3 (hereinafter, referred to as "collection-layer particles"), particles of a pore-forming agent, and a flocculating agent with water. The collection-layer particles include, for example, particles of silicon carbide (SiC) or cerium oxide ($CeO_2$) that is a raw material of the chief material of the aforementioned collection layer 3, and particles of the composite oxide catalyst. As described above, in the case where the chief material of the collection layer 3 is formed of the composite oxide catalyst, the above collection-layer particles are primarily particles of the composite oxide catalyst.

The raw slurry contains particles (hereinafter, referred to as "flocculated particles") formed by flocculating, for example, collection-layer particles and particles of the pore-forming agent. In the case of making the raw slurry, the type and amount of the flocculating agent to be added, for example, are determined such that the particle diameter of the flocculated particles becomes greater than the mean pore diameter of the base material 2. This prevents or suppresses the flocculated particles from entering the pores of the base material 2 in step S12 described later. The viscosity of the raw slurry is, for example, in the range of 2 mPa·s to 30 mPa·s.

Next, the raw slurry is supplied to the first cells 231 in which the collection layer 3 is to be formed, among the cells 23 of the base material 2, from the inlets of the first cells 231 (i.e., the ends that do not have the mesh sealing parts 24) (step S12). The water in the raw slurry flows through the partition wall 22 of the base material 2 to the adjacent second cells 232 and flows out of the base material 2 from the ends of the second cells 232 on the side where the mesh sealing parts 24 are not provided. The flocculated particles in the raw slurry do not pass through the partition wall 22 and adhere to the inner surfaces of the first cells 231 to which the raw slurry has been supplied. This forms an intermediate in which the flocculated particles adhere generally uniformly to the inner surfaces of the first cells 231 of the base material 2.

When the supply of a predetermined amount of the raw slurry is completed, the intermediate from which water has run out is dried (step S13). For example, the intermediate is first dried at room temperature for 12 hours and then further dried by being heated at 80° C. for 12 hours. Thereafter, the intermediate is fired so that the collection-layer particles in a large number of flocculated particles adhering to the base material 2 are bonded together and spread to the surface of the base material 2, forming the porous collection layer 3 (step S14). In this firing step, the particles of the pore-forming agent contained in the collection layer 3 are removed by combustion, so that pores are formed in the collection layer 3. In step S14, the firing temperature is, for example, 1000° C. and the firing time is, for example, two hours.

Figure 4:
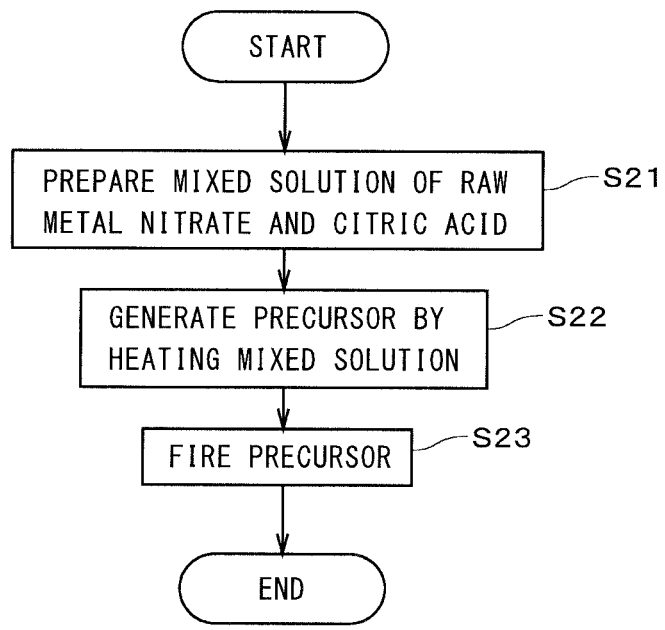
FIG. 4 is a flowchart of production of a composite oxide catalyst.

Next, one example of the method of producing the composite oxide catalyst contained in the raw slurry in step S11 described above will be described with reference to FIG. 4. The production method illustrated in FIG. 4 is a production method called a citric acid method. In the case of producing the composite oxide catalyst, first, weighed raw metal nitrates are dissolved in ion-exchanged water, together with citric acid serving as an additive, so as to prepare a mixed aqueous solution in which the raw metal nitrates and citric acid are mixed together (step S21). The raw metal nitrates include cerium nitrate ($Ce(NO_3)_3$), lanthanum nitrate ($La(NO_3)_3$), and third-metal nitrate (i.e., a nitrate of the third metal).

The ratio between the total number of moles of the raw metal nitrates and the number of moles of citric acid in step S21 is, for example, 1:1. For example, the preparation in step S21 is conducted under a condition heated to 80° C. In the weighing of the raw metal nitrates in step S21, the contents of Ce, La, and the third metal in the raw metals are determined such that the contents of Ce, La, and the third metal in the contained metals of the composite oxide catalyst become desired values. Note that the contents of Ce, La, and the third metal in the raw metals are respectively substantially equal to the contents of Ce, La, and the third metal in the contained metals of the composite oxide catalyst.

Then, a precursor of the composite oxide catalyst is obtained by heating the above mixed aqueous solution (step S22). In step S22, for example, the above mixed aqueous solution is heated and condensed at a temperature of 100° C. to 120° C. and further heated at a temperature of 150° C. to 300° C. so as to obtain powder of the above precursor.

Thereafter, the precursor is fired to obtain the composite oxide catalyst (step S23). In step S23, for example, the above powder of the precursor is heated at 400° C. for four hours under atmospheric pressure, and a substance obtained by the firing is pulverized in an agate mortar. Moreover, the pulverized substance is fired at 1000° C. for two hours under atmospheric pressure, and the fired substance is pulverized again in an agate mortar to obtain the composite oxide catalyst.

The production of the composite oxide catalyst may be conducted by another method other than the aforementioned citric acid method. For example, the composite oxide catalyst may be produced by an impregnation-supporting method. In this case, weighed lanthanum nitrate and weighed third-metal nitrate are first dissolved in ion-exchanged water to prepare an aqueous solution. Also, weighed cerium oxide is suspended in another ion-exchanged water different from the aqueous solution to prepare a suspension. Then, a liquid obtained by dropping the above aqueous solution in the suspension is heated to obtain a precursor of the composite oxide catalyst. Specifically, for example, the above suspension containing cerium oxide powder first is heated at a temperature of 100° C. to 120° C. and dried up and hardened, and then further heated at a temperature of 150° C. to 300° C. to obtain powder of the above precursor. Thereafter, the precursor is fired to obtain the composite oxide catalyst. Specifically, for example, the above powder of the precursor is fired at 400° C. for four hours under atmospheric pressure, and a substance obtained by the firing is pulverized in an agate mortar. Moreover, the pulverized substance is fired at 1000° C. for two hours under atmospheric pressure, and the fired substance is pulverized again in an agate mortar to obtain the composite oxide catalyst.

As another alternative, the composite oxide catalyst may be produced by a polymerized complex method. In this case, a compound of weighed raw metals is first dissolved in glycol, together with hydroxycarboxylic acid serving as an additive, to prepare a glycol solution (hereinafter, also referred to as a "mixed solution") in which the compound of raw metals and hydroxycarboxylic acid are mixed together. Examples of the compound of raw metals include alkoxide, halide, carbonate, sulfate, carboxylate, hydroxide, and nitrate of raw metals. Examples of the above hydroxycarboxylic acid include citric acid, tartaric acid, malic acid, glycerin, glyceric acid, oxy butyric acid, hydracrylic acid, lactic acid, and glycolic acid. Examples of the above glycol include ethylene glycol, propylene glycol, trimethylene glycol, 1,4-butanediol, 1,5-pentanediol, and 1,6-hexanediol. For example, cerium nitrate, lanthanum nitrate, and a nitrite of the third metal are used as the compound of raw metals, and citric acid and propylene glycol are used as hydroxycarboxylic acid and glycol. The ratio of the total number of moles of the compound of raw metals and the number of moles of hydroxycarboxylic acid is, for example, 1:10. The preparation of the mixed solution is conducted under a condition heated to 80° C., for example.

Then, a precursor of the composite oxide catalyst is obtained by heating the aforementioned mixed solution. Specifically, for example, the above mixed solution is heated and gelatinized at a temperature of 120° C. to 150° C. and further heated at a temperature of 300° C. to 400° C. to obtain powder of the above precursor. Thereafter, the precursor is fired to obtain the composite oxide catalyst. Specifically, for example, the above powder of the precursor is fired at 400° C. for four hours under atmospheric pressure, and a substance obtained by the firing is pulverized in an agate mortar. Moreover, the pulverized substance is fired at 1000° C. for two hours under atmospheric pressure, and the fired substance is pulverized again in an agate mortar so as to obtain the composite oxide catalyst.

Next, the relationship between the composite oxide catalyst and the temperature at which oxidation of soot starts (hereinafter, the "oxidation starting temperature of soot") will be described with reference to Tables 1 and 2.

TABLE 1

| | Composition (mol %) | | | | | Oxidation Starting Temperature (° C.) |
|---|---|---|---|---|---|---|
| | Ce | La | Mn | Pr | Co | |
| Example 1 | 80 | 10 | 10 | — | — | 320 |
| Example 2 | 93 | 3.5 | 3.5 | — | — | 323 |
| Example 3 | 52 | 24 | 24 | — | — | 313 |
| Example 4 | 30 | 35 | 35 | — | — | 345 |
| Example 5 | 10 | 45 | 45 | — | — | 342 |
| Example 6 | 80 | 15 | 5 | — | — | 340 |
| Example 7 | 80 | 5 | 15 | — | — | 340 |
| Example 8 | 80 | 10 | — | 10 | — | 322 |
| Example 9 | 80 | 10 | — | — | 10 | 345 |
| Example 10 | 80 | 10 | 10 | — | — | 351 |
| Example 11 | 80 | 10 | 10 | — | — | 355 |
| Comparative Example 1 | 100 | — | — | — | — | 364 |
| Comparative Example 2 | 80 | 20 | — | — | — | 389 |
| Comparative Example 3 | 80 | — | 20 | — | — | 386 |
| Comparative Example 4 | — | 50 | 50 | — | — | 380 |
| Comparative Example 5 | — | — | — | — | — | 450 |

TABLE 2

| | Structure | Diameters of Cavities (μm) | Production Method | Raw Material for Ce | Additive for Preparation |
|---|---|---|---|---|---|
| Example 1 | Sparse | 0.2-5 | Citric Acid Method | Cerium Nitrate | Citric Acid |
| Example 2 | Sparse | 0.2-5 | Citric Acid Method | Cerium Nitrate | Citric Acid |
| Example 3 | Sparse | 0.2-5 | Citric Acid Method | Cerium Nitrate | Citric Acid |
| Example 4 | Sparse | 0.2-5 | Citric Acid Method | Cerium Nitrate | Citric Acid |
| Example 5 | Sparse | 0.2-5 | Citric Acid Method | Cerium Nitrate | Citric Acid |
| Example 6 | Sparse | 0.2-5 | Citric Acid Method | Cerium Nitrate | Citric Acid |
| Example 7 | Sparse | 0.2-5 | Citric Acid Method | Cerium Nitrate | Citric Acid |
| Example 8 | Sparse | 0.2-5 | Citric Acid Method | Cerium Nitrate | Citric Acid |
| Example 9 | Sparse | 0.2-5 | Citric Acid Method | Cerium Nitrate | Citric Acid |
| Example 10 | Dense | x | Impregnation-Supporting Method | Cerium Oxide | — |
| Example 11 | Dense | x | Polymerized Complex Method | Cerium Nitrate | Citric Acid Propylene Glycol |
| Comparative Example 1 | Sparse | 0.2-5 | Citric Acid Method | Cerium Nitrate | Citric Acid |
| Comparative Example 2 | Sparse | 0.2-5 | Citric Acid Method | Cerium Nitrate | Citric Acid |
| Comparative Example 3 | Sparse | 0.2-5 | Citric Acid Method | Cerium Nitrate | Citric Acid |
| Comparative Example 4 | Sparse | 0.2-5 | Citric Acid Method | Cerium Nitrate | Citric Acid |
| Comparative Example 5 | — | — | — | — | — |

In the composite oxide catalysts of Examples 1 to 11, the Ce content in the contained metals is in the range of 10 mol % to 93 mol %, the La content therein is in the range of 3.5 mol % to 45 mol %, and the content of the third metal therein is in the range of 3.5 mol % to 45 mol %. In Examples 1 to 7 and 10 and 11, the third metal is Mn. In Example 8, the third metal is Pr, and in Example 9, the third metal is Co.

Figure 5:
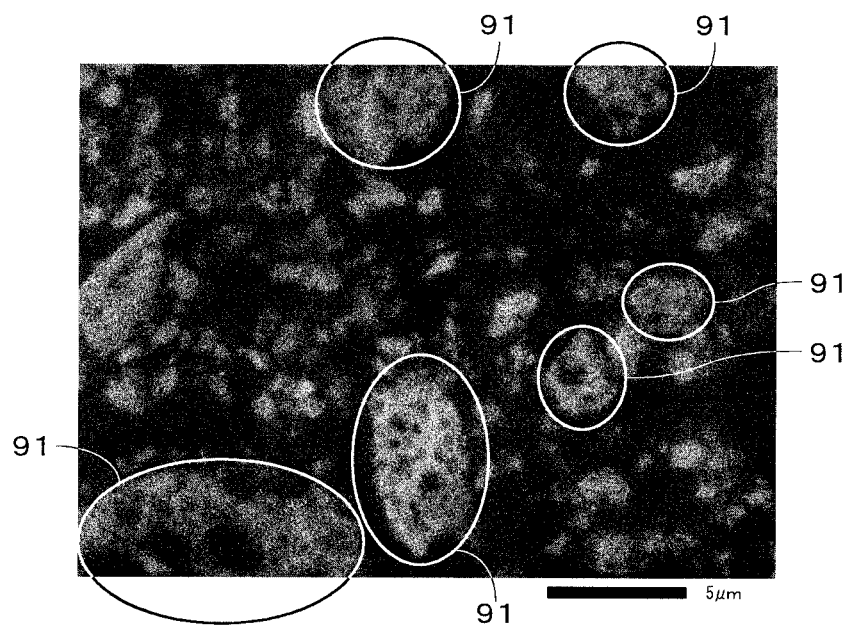
FIG. 5 is an SEM image of a composite oxide catalyst of Example 1.

In Examples 1 to 9, the composite oxide catalysts are produced by the aforementioned citric acid method. FIG. 5 is an SEM image acquired by capturing an image of the composite oxide catalyst of Example 1 at 5000× magnification by an SEM. The composite oxide catalyst of Example 1 is bulky and contains sparse particles including relatively large cavities, as surrounded by circles indicated by reference sign 91 in FIG. 5. In Table 2, this structure of the composite oxide catalyst of Example 1 is described as "sparse." In Examples 2 to 9 as well, the composite oxide catalysts have "sparse" structures generally as in Example 1. For example, the composite oxide catalysts of Examples 1 to 9 contain sparse particles having a large number of cavities with diameters greater than or equal to 0.2 μm and less than or equal to 5 μm.

The above diameters of the cavities are obtained by the following method. First, an image of the surface of a composite oxide catalyst is taken at 5000× magnification by an SEM to acquire an SEM image as illustrated in FIG. 5. Then, the SEM image is analyzed using, for example, the aforementioned image analysis software "Image-Pro version 9.3.2" to obtain the diameters of the cavities of the particles in the composite oxide catalyst. The diameters of the cavities are, for example, Feret diameters (JIS Z 8827-1) of the cavities (i.e., dark parts existing in the particles, which are bright parts) in the above SEM image. The Feret diameter is an interval between two parallel straight lines extending in a predetermined direction (e.g., left-right direction) in an SEM image when a cavity is sandwiched between these two straight lines so that the two straight lines circumscribe the cavity (i.e., the distance between the two straight lines in a direction perpendicular to the two straight lines).

Figure 6:
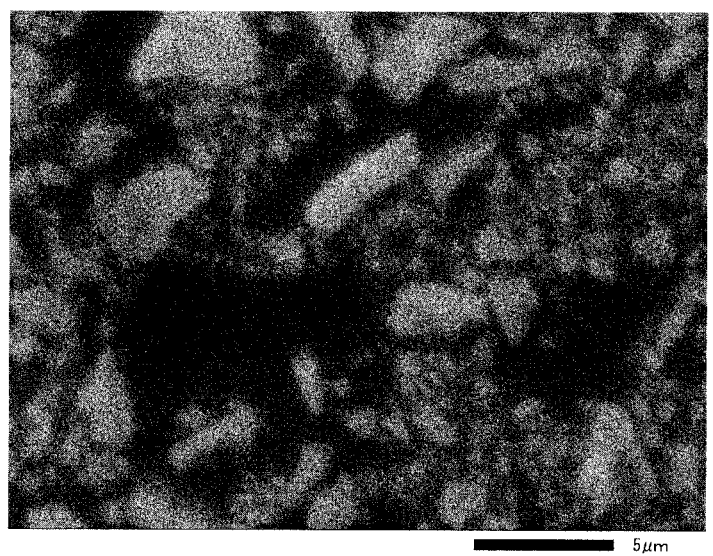
FIG. 6 is an SEM image of a composite oxide catalyst of Example 11.

The composite oxide catalyst of Example 10 is produced by the aforementioned impregnation-supporting method, and the composite oxide catalyst of Example 11 is produced by the aforementioned polymerized complex method. FIG. 6 is an SEM image acquired by capturing an image of the composite oxide catalyst of Example 11 at 5000× magnification by an SEM. The composite oxide catalyst of Example 11 has a "dense" structure different from the "sparse" structure in Example 1. Specifically, in the composite oxide catalyst of Example 11, particles substantially do not have cavities of recognizable sizes in the SEM image taken at 5000× magnification, or even if cavities are recognizable in the particles, the above diameters of the cavities are less than 0.2 μm. In this case, a cross is written in the column "Diameters of Cavities" in Table 2. In Example 10 as well, the composite oxide catalyst has a "dense" structure generally as in Example 11.

In the oxide catalyst of Comparative Example 1, the Ce content in the contained metals is 100 mol %. That is, the oxide catalyst of Comparative Example 1 contains only one type of metal. On the other hand, the oxide catalysts of Comparative Examples 2 to 4 contain only two types of metals. In the oxide catalyst of Comparative Example 2, the Ce content in the contained metals is 80 mol %, and the La content therein is 20 mol %. In the oxide catalyst of Comparative Example 3, the Ce content in the contained metals is 80 mol %, and the Mn content therein, i.e., the content of the third metal, is 20 mol %. In the oxide catalyst of Comparative Example 4, the La content in the contained metals is 50 mol %, and the Mn content therein, i.e., the content of the third metal, is 50 mol %. In Comparative Examples 1 to 4, the oxide catalysts are produced by the aforementioned citric acid method. The oxide catalysts of Comparative Examples 1 to 4 have "sparse" structures generally as in Examples 1 to 9.

Table 1 shows the oxidation starting temperature of soot when the soot obtained by combustion of gasoline (so-called gasoline soot, and hereinafter simply referred to as "soot") was mixed and heated together with the composite oxide catalysts of Examples 1 to 11 or the oxide catalysts of Comparative Examples 1 to 4. Comparative Example 5 shows the oxidation starting temperature of soot when no catalyst was used.

The oxidation starting temperature of soot was obtained as follows. In Examples 1 to 11, powder of the composite oxide catalyst and soot were first mixed together at a weight ratio of 95:5 so as to obtain a composite sample of the composite oxide catalyst and the soot. In the composite sample, the soot and the composite oxide catalyst were in a loose contact (LC) condition that was close to a condition of contact between the collection layer 3 and particulate matter collected in the collection layer 3. Then, the above composite sample was subjected to measurement using a TPD-MS (heat-induced gas analyzing) apparatus. Specifically, 0.04 g of the composite sample was heated to 700° C. in accordance with a predetermined heat-up program (e.g., at a heat-up rate of 20° C./min) under an atmosphere in which a mixed gas containing 80% of helium (He) and 20% of oxygen (O) flowed at a flow rate of 50 mL/min. Then, a change in the concentration of gases produced by the heating from the composite sample was measured to acquire a change in the amount of carbon monoxide (CO) generated by the combustion (i.e., oxidation) of the soot. Thereafter, the temperature at which the accumulated amount of CO generated had reached 20% of the total amount of CO to be generated was set to the temperature at which oxidation of the soot had occurred (i.e., oxidation starting temperature). The composite oxide catalyst has higher catalytic performance as the oxidation starting temperature is lower.

In Comparative Examples 1 to 4, the oxidation starting temperature was measured by a method similar to that described above, except that the oxide catalyst of each comparative example was used, instead of the aforementioned composite oxide catalyst, for the preparation of the composite sample. In Comparative Example 5, the oxidation starting temperature was measured by a method similar to that described above, except that soot with no catalyst mixed was used, instead of the aforementioned composite sample.

As shown in Comparative Example 5, the oxidation starting temperature in the case of using only the soot is 450° C. and high. The oxidation starting temperatures in Comparative Examples 1 to 4 are in the range of 364° C. to 389° C. and also relatively high. In contrast, the oxidation starting temperatures of Examples 1 to 11 are in the range of 313° C. to 355° C. and lower than those in Comparative Examples 1 to 5.

Referring to Examples 1 to 11, the oxidation starting temperatures in Examples 1 to 9 (the production method: citric acid method, the structure of the composite oxide catalyst: sparse) are in the range of 313° C. to 345° C. and lower than the oxidation starting temperatures of 351° C. to 355° C. in Examples 10 and 11 (the production method: impregnation-supporting method or the polymerized complex method, the structure of the composite oxide catalyst: dense). The oxidation starting temperatures in Example 1 (third metal: Mn, 10 mol %) and Example 8 (third metal: Pr, 10 mol %) are respectively 320° C. and 322° C. and lower than the oxidation starting temperature of 345° C. in Example 9 (third metal: Co, 10 mol %).

The oxidation starting temperature in Example 1 (La content=Mn content, La content+Mn content=20 mol %) is 320° C. and lower than the oxidation starting temperatures of 340° C. in Examples 6 and 7 (La content Mn content, La content+Mn content=20 mol %). The oxidation starting temperatures in Examples 1 to 3 (Ce content of 52 mol % to 93 mol %) are in the range of 313° C. to 323° C. and lower than the oxidation starting temperatures of 342° C. and 345° C. in Examples 4 and 5 (Ce content of 10 mol % to 30 mol %).

As described above, the composite oxide catalyst includes Ce that is the first metal, La that is the second metal, and the third metal as the contained metals. The third metal is a transition metal, or a rare-earth metal other than Ce and La. The Ce content in the contained metals is higher than or equal to 5 mol % and lower than or equal to 95 mol %. The La content in the contained metals is higher than or equal to 2 mol % and lower than or equal to 93 mol %. The content of the third metal in the contained metals is higher than or equal to 2 mol % and lower than or equal to 93 mol %. As described above, the composite oxide catalyst can lower the oxidation starting temperature of an object such as particulate matter. The above composite oxide catalyst can also reduce the cost of its production because it substantially does not contain any expensive metal such as the elements of the platinum group.

As described above, in the composite oxide catalyst, the above Ce content in the contained metals is preferably higher than or equal to 50 mol % and lower than or equal to 95 mol %. The La content in the contained metals is preferably higher than or equal to 2 mol % and lower than or equal to 48 mol %. The content of the third metal in the contained metals is preferably higher than or equal to 2 mol % and lower than or equal to 48 mol %. This further lower the oxidation starting temperature of an object such as particulate matter.

More preferably, the third metal is Mn or Pr, and the La content in the contained metals is equal to the content of the third metal in the contained metals. This further lowers the oxidation starting temperature of an object such as particulate matter.

As described above, the composite oxide catalyst preferably contains particles including cavities when viewed in an SEM image taken at 5000× magnification. By using the above cavities to establish contact between an object such as particulate matter and the composite oxide catalyst, the composite oxide catalyst can increase the area of contact between the object and the composite oxide catalyst. As a result, it is possible to further lower the oxidation starting temperature of the object.

More preferably, the above diameters of the cavities are greater than or equal to 0.2 μm and less than or equal to 5 μm. This facilitates the entry of an object such as particulate matter into the cavities and thereby accelerates the contact between the object and the composite oxide catalyst. As a result, it is possible to further lower the oxidation starting temperature of the object.

As described above, the porous composite 1 includes the porous base material 2 and the porous collection layer 3 formed on the base material 2. The collection layer 3 includes the aforementioned composite oxide catalyst. Accordingly, it is possible in the porous composite 1 to oxidize (i.e., burn) and remove particulate matter collected in the collection layer 3 at a low temperature. As a result, heat resistance required for the porous composite 1 can be alleviated, and the degree of freedom in the design of the porous composite 1 can be improved.

As described above, it is preferable that the base material 2 has a honeycomb structure whose inside is partitioned into a plurality of cells 23 by the partition wall 22, and at least some of the cells 23 have inner surfaces covered with the collection layer 3. The porous composite 1 having this structure can achieve both favorable collection of particulate matter and a reduction in pressure loss. Moreover, as described above, the porous composite 1 can accelerate the oxidation of collected particulate matter and therefore can lower the oxidation starting temperature of the particulate matter. Accordingly, the porous composite 1 is in particular suitable for use as a GPF for collecting particulate matter in an exhaust gas emitted from a gasoline engine.

The aforementioned method of producing a composite oxide catalyst includes the step of preparing a mixed aqueous solution by mixing nitrates of raw metals and citric acid, the step of obtaining a precursor by heating the mixed aqueous solution, and the step of obtaining a composite oxide catalyst by firing the precursor. The raw metals include Ce that is a first metal, La that is a second metal, and a third metal. The third metal is a transition metal, or a rare-earth metal other than Ce and La. A Ce content in the raw metals is higher than or equal to 5 mol % and lower than or equal to 95 mol %. An La content in the raw metals is higher than or equal to 2 mol % and lower than or equal to 93 mol %. A content of the third metal in the raw metals is higher than or equal to 2 mol % and lower than or equal to 93 mol %. In the same manner as described above, the composite oxide catalyst produced by this production method can lower the oxidation starting temperature of an object such as particulate matter. This production method can readily produce the composite oxide catalyst that contains particles including cavities. As a result, it is possible to further lower the oxidation starting temperature of an object.

The composite oxide catalyst, the method of producing the composite oxide catalyst, and the porous composite 1 described above may be modified in various ways.

For example, in the production of the composite oxide catalyst illustrated in steps S21 to S23 (i.e., the production of the composite oxide catalyst by the citric acid method), the ratio between the total number of moles of the raw metal nitrates and the number of moles of citric acid in step S21 may be changed in various ways. The heating temperature of the mixed aqueous solution in step S22 and the firing temperature and the firing time in step S23 may also be changed in various ways.

In the production of the composite oxide catalyst by the impregnation-supporting method and the polymerized complex method, the heating temperature in generating the precursor and the firing temperature and the firing time in generating the composite oxide catalyst may be changed in various ways. In the production of the composite oxide catalyst by the polymerized complex method, the ratio between the total number of moles of the raw metal nitrates and the number of moles of citric acid in step S21 may also be changed in various ways. Note that the composite oxide catalyst may be produced by various production methods other than the citric acid method, the impregnation-supporting method, and the polymerized complex method described above.

The porous composite 1 is not limited to the aforementioned GPF, and may, for example, be a diesel particulate filter (DPF) for collecting particulate matter in an exhaust gas emitted from a diesel engine. As described above, the porous composite 1 can lower the oxidation starting temperature of collected particulate matter and is thus suitable not only for use as a GPF, but also for use in particular as a DPF. Note that the porous composite 1 may be used as any of various filters other than a GPF and a DPF. As another alternative, the porous composite 1 may be used in applications other than filters.

The structure of the porous composite 1 may be changed in various ways. For example, the mesh sealing parts 24 may be omitted from the base material 2. the collection layer 3 may be provided on the inner surfaces of all of the cells 23. Moreover, the base material 2 does not necessarily have to have a honeycomb structure, and may have any other shape whose inside is not partitioned by a partition wall, such as a simple tubular shape or a simple flat plate shape.

Figure 3:
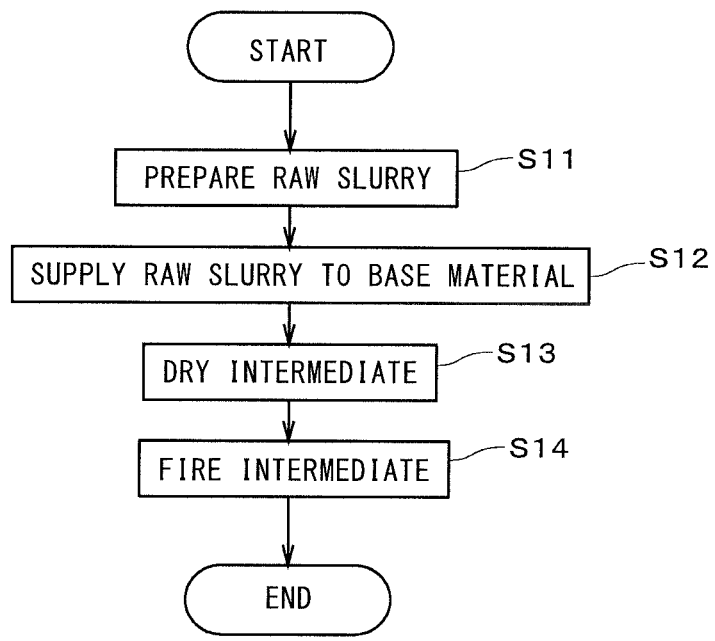
FIG. 3 is a flowchart of production of the porous composite.

The method of producing the porous composite 1 is not limited to the one illustrated in FIG. 3 and may be changed in various ways. For example, in step S12, the method of supplying the raw slurry to the base material 2 may be changed in various ways. The supply of the raw material of the collection layer 3 to the base material 2 is not limited to a filtering system using the raw slurry, and may be conducted by various methods such as dipping, spraying, or drying. The drying method and the drying time of the intermediate in step S13 and the firing temperature and the firing time of the intermediate in step S14 may also be changed in various ways.

The composite oxide catalyst does not necessarily have to be included in the collection layer 3 of the porous composite 1, and may be provided singly or may be provided with other structure and used to accelerate the oxidation of particulate matter or other objects.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The present invention is applicable to a composite oxide catalyst that is used as a filter for collecting particulate matter such as a gasoline particulate filter for collecting particulate matter in an exhaust gas emitted from a gasoline engine.

REFERENCE SIGNS LIST

1 Porous composite
2 Base material
3 Collection layer
22 Partition wall
23 Cell
S21 to S23 Step

The invention claimed is:

1. A composite oxide catalyst comprising:
   cerium that is a first metal, lanthanum that is a second metal, and a third metal as contained metals,
   wherein said third metal is a transition metal, or a rare-earth metal other than cerium and lanthanum,
   a cerium content in said contained metals is higher than 10 mol % of said contained metals and lower than or equal to 95 mol % of said contained metals,
   a lanthanum content in said contained metals is higher than or equal to 2 mol % of said contained metals and lower than or equal to 93 mol % of said contained metals,
   a content of said third metal in said contained metals is higher than or equal to 2 mol % of said contained metals and lower than or equal to 93 mol % of said contained metals,
   said composite oxide catalyst substantially does not contain the elements of the platinum group, and
   said composite oxide catalyst comprises particles including cavities when viewed in an SEM image at 5000× magnification.

2. The composite oxide catalyst according to claim 1, wherein
   the cerium content in said contained metals is higher than or equal to 50 mol % and lower than or equal to 95 mol %,
   the lanthanum content in said contained metals is higher than or equal to 2 mol % and lower than or equal to 48 mol %, and
   the content of said third metal in said contained metals is higher than or equal to 2 mol % and lower than or equal to 48 mol %.

3. The composite oxide catalyst according to claim 2, wherein
   said third metal is manganese or praseodymium, and
   the lanthanum content in said contained metals is equal to the content of said third metal in said contained metals.

4. The composite oxide catalyst according to claim 1, wherein said cavities have diameters greater than or equal to 0.2 μm and less than or equal to 5 μm.

5. A porous composite comprising:
   a porous base material; and
   a porous collection layer formed on said base material,
   wherein said collection layer includes the composite oxide catalyst according to claim 1.

6. The porous composite according to claim 5, wherein
   said base material has a honeycomb structure whose inside is partitioned into a plurality of cells by a partition wall, and
   at least some of said plurality of cells have inner surfaces covered with said collection layer.

7. The porous composite according to claim 6, being a filter that collects particulate matter in an exhaust gas emitted from a gasoline engine or a diesel engine.

8. A method of producing a composite oxide catalyst according to claim 1, comprising:
   preparing a mixed aqueous solution by mixing a nitrate of a raw metal and citric acid;
   obtaining a precursor by heating said mixed aqueous solution; and
   obtaining a composite oxide catalyst by firing said precursor,
   wherein said raw metal includes cerium that is a first metal, lanthanum that is a second metal, and a third metal,
   said third metal is a transition metal, or a rare-earth metal other than cerium and lanthanum,
   a cerium content in said raw metal is higher than or equal to 5 mol % and lower than or equal to 95 mol %,
   a lanthanum content in said raw metal is higher than or equal to 2 mol % and lower than or equal to 93 mol %, and
   a content of said third metal in said raw metal is higher than or equal to 2 mol % and lower than or equal to 93 mol %.

* * * * *